United States Patent
Wang et al.

(10) Patent No.: US 11,950,236 B2
(45) Date of Patent: Apr. 2, 2024

(54) NODE AND METHOD FOR PRESCHEDULING ULINK RESOURCES IN A WIRELESS NETWORK ACCORDING TO A UE'S APPLICATION REQUIREMENTS

(71) Applicant: Telefonaktiebolaget LM Ericsson (publ), Stockholm (SE)

(72) Inventors: Xiaohui Wang, Limhamn (SE); Gunnar Mildh, Sollentuna (SE); Conor White, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 238 days.

(21) Appl. No.: 15/565,219

(22) PCT Filed: May 20, 2015

(86) PCT No.: PCT/EP2015/061056
§ 371 (c)(1),
(2) Date: Oct. 9, 2017

(87) PCT Pub. No.: WO2016/184510
PCT Pub. Date: Nov. 24, 2016

(65) Prior Publication Data
US 2018/0077720 A1    Mar. 15, 2018

(51) Int. Cl.
H04W 72/21    (2023.01)
H04W 72/51    (2023.01)
(Continued)

(52) U.S. Cl.
CPC .......... *H04W 72/21* (2023.01); *H04W 72/51* (2023.01); *H04W 72/54* (2023.01);
(Continued)

(58) Field of Classification Search
CPC ......... H04W 72/1284; H04W 72/1247; H04W 72/08; H04W 72/1242; H04W 72/048; H04L 47/14
See application file for complete search history.

(56) References Cited

U.S. PATENT DOCUMENTS 9,119,093 B2 *   8/2015  Nordstrom ........ H04W 72/1268
9,705,572 B2     7/2017  Fijishiro
(Continued)

FOREIGN PATENT DOCUMENTS

CN          102104974 A      6/2011
WO       2013044985 A1       4/2013
(Continued)

OTHER PUBLICATIONS

Pelletier et al., U.S. Appl. No. 62/096,221, filed Dec. 23, 2014 (Year: 2014).*
(Continued)

*Primary Examiner* — Yu-Wen Chang
(74) *Attorney, Agent, or Firm* — COATS & BENNETT, PLLC

(57) ABSTRACT

Example embodiments presented herein are directed towards a wireless device (101) and a network node (102, 103, 104, 110, 111, 115), and corresponding methods therein, for prescheduling uplink communications in a wireless network. Such prescheduling is performed prior to the time the uplink communication is needed. According to the example embodiments, the prescheduling is performed with the network node having knowledge of a communication pattern of the wireless device via at least one prescheduling parameter obtained by the network node (the base station, or a core network node), either transmitted by the wireless device or else retrieved by the network node from subscription or historical data. The prescheduling parameter may (Continued)

relate to the application or service that has been activated, and a prescheduling cancellation is sent when it is halted.

34 Claims, 13 Drawing Sheets

(51) Int. Cl.
 H04W 72/54 (2023.01)
 H04W 72/566 (2023.01)
 H04W 8/04 (2009.01)

(52) U.S. Cl.
 CPC ....... H04W 72/566 (2023.01); H04W 72/569 (2023.01); H04W 8/04 (2013.01)

(56) References Cited

U.S. PATENT DOCUMENTS

| | | | |
|---|---|---|---|
| 2004/0203658 A1 | 10/2004 | Narayanan | |
| 2010/0317364 A1* | 12/2010 | Zhang | H04W 16/04 |
| | | | 455/452.2 |
| 2012/0142371 A1* | 6/2012 | Park | H04W 60/02 |
| | | | 455/456.1 |
| 2013/0051326 A1* | 2/2013 | Jeyatharan | H04L 47/824 |
| | | | 370/328 |
| 2013/0182623 A1* | 7/2013 | Fan | H04W 4/70 |
| | | | 370/311 |
| 2013/0201851 A1* | 8/2013 | Chou | H04W 36/26 |
| | | | 370/252 |
| 2014/0105191 A1 | 4/2014 | Yang et al. | |
| 2014/0126492 A1* | 5/2014 | Gleixner | H04W 4/70 |
| | | | 370/329 |
| 2014/0198663 A1* | 7/2014 | Xu | H04W 52/0258 |
| | | | 370/241 |
| 2014/0302846 A1* | 10/2014 | Zou | H04B 17/318 |
| | | | 455/435.1 |
| 2014/0369245 A1* | 12/2014 | Pecen | H04W 52/0212 |
| | | | 370/311 |
| 2015/0163789 A1* | 6/2015 | Vasudevan | H04W 76/14 |
| | | | 370/259 |
| 2015/0208350 A1* | 7/2015 | Li | H04W 74/02 |
| | | | 370/336 |
| 2015/0237649 A1* | 8/2015 | Zhang | H04W 72/121 |
| | | | 370/329 |
| 2015/0271791 A1* | 9/2015 | Webb | H04W 4/70 |
| | | | 370/230 |
| 2015/0304982 A1* | 10/2015 | Liao | H04W 64/00 |
| | | | 455/456.2 |
| 2015/0373528 A1* | 12/2015 | Iwai | H04W 4/70 |
| | | | 455/419 |
| 2016/0295624 A1* | 10/2016 | Novlan | H04W 76/14 |
| 2017/0019919 A1* | 1/2017 | Liang | H04W 72/042 |
| 2017/0367058 A1* | 12/2017 | Pelletier | H04W 56/0045 |
| 2018/0146418 A1* | 5/2018 | Sharma | H04W 48/16 |

FOREIGN PATENT DOCUMENTS

| | | |
|---|---|---|
| WO | 2014081197 A1 | 5/2014 |
| WO | 2015050480 A1 | 4/2015 |
| WO | 2015064524 A1 | 5/2015 |

OTHER PUBLICATIONS

3GPP TS 24.301 version 12.8.0 Release 12, Apr. 2015 (Year: 2015).*
3rd Generation Partnership Project, "Technical Specification Group Services and System Aspects; Study on Machine-Type Communications (MTC) and other mobile data applications communications enhancements (Release 12)", 3GPP TR 23.887 V12.0.0, Dec. 2013, pp. 1-151.

* cited by examiner

NODE AND METHOD FOR PRESCHEDULING ULINK RESOURCES IN A WIRELESS NETWORK ACCORDING TO A UE'S APPLICATION REQUIREMENTS

TECHNICAL FIELD

Example embodiments presented herein are directed towards a wireless device and a network node, and corresponding methods therein, for prescheduling uplink communications in a wireless network.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Communications between a wireless device, or a user equipment (UE), and the wireless communications network are scheduled. The scheduler is an entity to distribute the radio interfaces and RBS resources for data transfer of associated UEs and corresponding control signals. For a 4G RBS, also known as an eNB, the scheduler is responsible for dividing the physical resource blocks in frequency as well as time to various UEs in both downlink (DL) and uplink (UL) efficiently.

Currently, the scheduler only grants UL resources to the active UE that reports its buffer status about the size of data to be sent. This is very resource-efficient, yet has long latency due to the process of scheduling request and grant.

In order to reduce the UL scheduling latency, some vendor implement predictive prescheduling, even when there is no request for resources. Typically, resources are only assigned when requested, due to resource efficiency, but some implementations may, for example, at low load, try to predict when UL may be needed and proactively pre-schedule such resources for the wireless device.

SUMMARY

The problems associated with current prescheduling are waste of resources and power. Although the predictive prescheduling feature as described above reduces the latency of UL data transfer as comparing to the standard procedure, the drawback is that the pre-allocated UL resources are not requested by the UEs and with high probability not used due to lack of data to be transferred.

Thus, at least one object of some of the example embodiments presented herein is to provide pre-allocated UL resources which take into account an availability or need of the UE. Thus, some of the example embodiments are directed towards performing an UE originating service request with an associated pre-defined scheduling parameter set for a given application or device type, for example, a smartphone, critical machine type communication device, or sensor device. This is to be done prior to the completion of the service so that the scheduler in the eNB may allocate the UL resources, including performing prescheduling, for the UE and the mobile network (NW) may set up the bearers ahead of the expected data requirements of the application. The usage of this feature may be controlled by the end-user, application or application servers, or by the network, for example, based on subscription information, device type, or device configuration. According to some of the example embodiments, the idea of prescheduling may be extended to DL for cases such as fixed control-loop actuators.

At least one example advantage of some of the example embodiments presented herein is to achieve reduced latency while keeping the resource and power consumption down, and improve the services provided by the mobile NW because the prescheduled UL resources are initiated by the UE for the application that the user is initiating.

A further example advantage is may also be provided with the use of new applications related to critical machine type communication services such as intelligent traffic systems, smart grid, factory automation, remote driving, etc. Specifically, these services typically require low/bounded latency, and have a periodic or in other ways predictable traffic pattern, which would benefit from the pre-scheduling according to the example embodiments.

Accordingly, some of the example embodiments are directed towards a method, in a wireless device, for prescheduling an uplink communication in a wireless network. The method comprises sending, to a network node, at least one prescheduling parameter indicative of a communication pattern of the wireless device. The method further comprises receiving, from a base station, an uplink grant for communication according to the at least one prescheduling parameter.

Some of the example embodiments are directed towards a wireless device for prescheduling an uplink communication in a wireless network. The wireless device comprises a processor and a memory. The memory comprises instructions executable by the processor whereby the wireless device is operative to send, to a network node, at least one prescheduling parameter indicative of a communication pattern of the wireless device. The wireless device is also operative to receive, from a base station, an uplink grant for communication according to the at least one prescheduling parameter.

Some of the example embodiments are directed towards a method, in a network node, for prescheduling an uplink communication in a wireless network. The method comprises receiving at least one prescheduling parameter indicative of a communication pattern of a wireless device. The method also comprises sending, to the wireless device, an uplink grant for communication according to the at least one prescheduling parameter.

Some of the example embodiments are directed towards a network node for prescheduling an uplink communication in a wireless network. The network node comprises a processor and a memory. The memory comprises instructions executable by the processor whereby the network node is operative to receive at least one prescheduling parameter indicative of a communication pattern of a wireless device. The network node is also operative to send, to the wireless device, an uplink grant for communication according to the at least one prescheduling parameter.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

The terminology used herein is for the purpose of describing the example embodiments and is not intended to limit the embodiments presented herein. It should also be appreciated that the term wireless device and user equipment may be used interchangeably. It should also be appreciated that a Machine Type Communication (MTC) device is a subcategory of a specific type of wireless device/user equipment (UE). The term MTC device and Machine to Machine (M2M) device may be used interchangeably.

It should further be appreciated that the term network node used herein shall be interpreted as being a base station, Mobility Management Entity (MME), Serving General Packet Radio Service Support Node (SGSN) or a S4-SGSN serving the wireless device. The terms base station and eNB may also be used interchangeably. It should be appreciated that all of the example embodiments presented herein may be applicable to a Global System for Mobile communications/EDGE Radio Access Network (GERAN), Universal Terrestrial Radio Access Network (UTRAN) or Evolved UTRAN (E-UTRAN) based system.

General Overview

Figure 1:
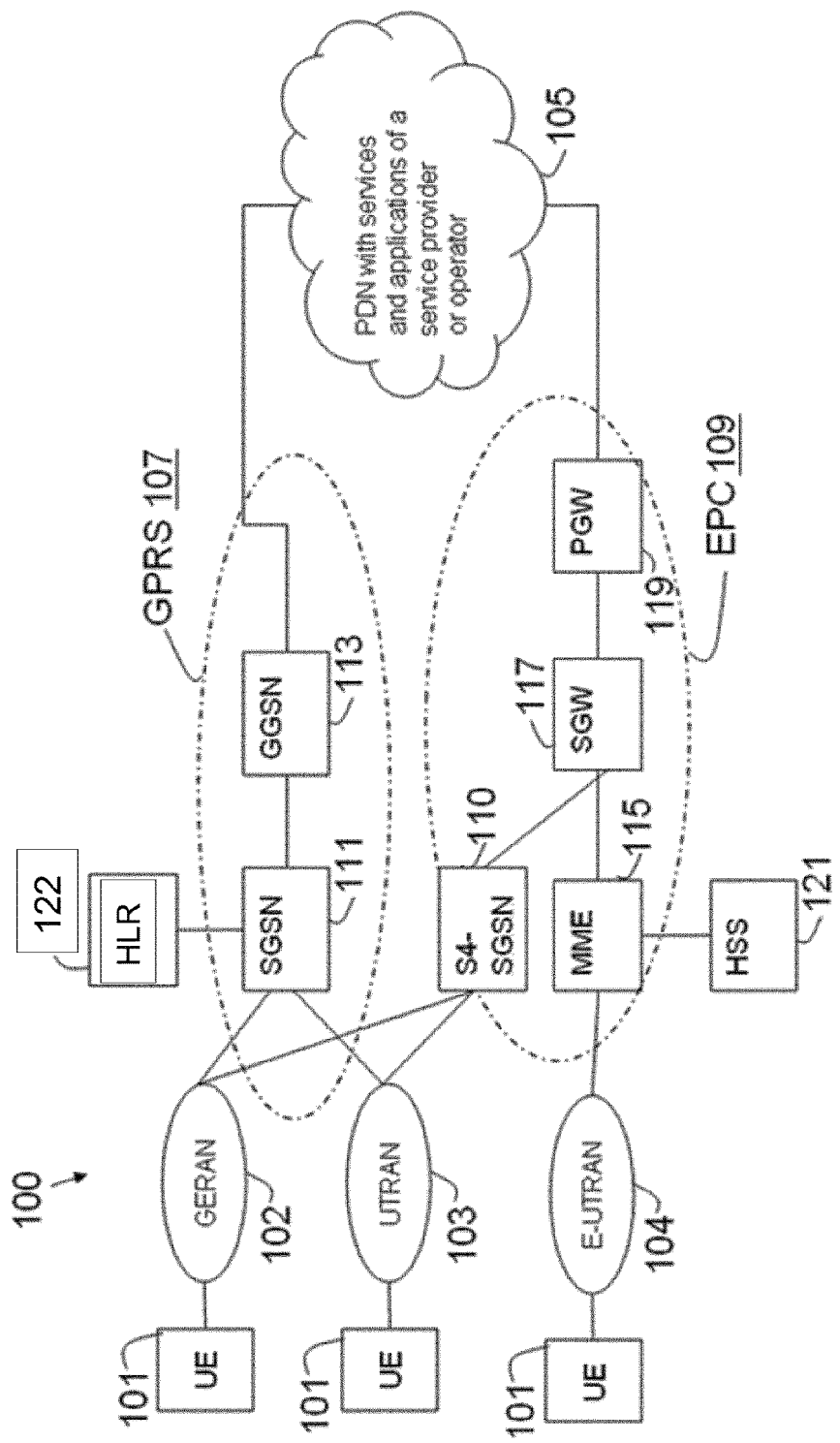
FIG. 1 is an illustrative example of a wireless network.

Example embodiments presented herein are directed towards a means to provide pre-allocated uplink (UL) resources which take into account an availability or need of the UE. In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to Application Sever (AS) or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the Packet Data Network (PDN) 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111 and the MME 115 may be in communication with a Home Location Register (HLR) 122 and Home Subscriber Server (HSS) 121, respectively, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

Communications between a wireless device, or a user equipment, and the wireless communications network are scheduled. The scheduler is an entity to distribute the radio interfaces and Radio Base Station (RBS) resources for data transfer of associated UEs and corresponding control signals.

Currently, the scheduler only grants UL resources to the active UE that reports its buffer status about the size of data to be sent. This is very resource-efficient, yet has long latency due to the process of scheduling request and grant. In order to reduce the UL scheduling latency, some vendor implement predictive prescheduling, even when there is no request for resources. Typically, resources are only assigned when requested, due to resource efficiency, but some implementations may, for example, at low load, try to predict when UL may be needed and proactively pre-schedule such resources for the wireless device.

Overview of the Example Embodiments

The problems associated with current prescheduling are waste of resources and power. Although the predictive prescheduling feature as described above reduces the latency of UL data transfer as comparing to the standard procedure, the drawback is that the pre-allocated UL resources are not requested by the UEs and with high probability not used due to lack of data to be transferred.

Thus, at least one object of some of the example embodiments presented herein is to provide pre-allocated UL resources which take into account an availability or need of the UE. Thus, some of the example embodiments are directed towards performing an UE originating service request with an associated pre-defined scheduling parameter for a given application or device type, for example, a smartphone, critical machine type communication device, or sensor device. Specifically, the prescheduling parameter is indicative of a communication pattern of a wireless device. According to some of the example embodiments, the communication pattern may comprise information regarding how frequent communication is made or a communication schedule for the wireless device.

This is to be done prior to the completion of the service so that the scheduler in the eNB may allocate the UL resources, including performing prescheduling, for the UE and the mobile network (NW) may set up the bearers ahead of the expected data requirements of the application. The usage of this feature may be controlled by the end-user, application or application servers, or by the network, for example, based on subscription information, device type, or device configuration. According to some of the example embodiments, the idea of prescheduling may be extended to DL for cases such as fixed control-loop actuators.

The remainder of the text is organized as follows. First, the prescheduling of wireless devices with known or fixed communication patterns is discussed under the subheading 'Prescheduling of MTC devices', according to some of the example embodiments. Thereafter, the prescheduling of uplink communications which are triggered by the use of an application, service or function are discussed under the subheading 'Application based prescheduling', according to some of the example embodiments. Example embodiments which take into account communication priorities as well as a current status of a network, for example, due to congestion, are explained under the subheading 'Prescheduling and priority'. Furthermore, example embodiments in which a mobility management node, for example, a MME, SGSN or a S4-SGSN, provides prescheduling for a wireless device are discussed under the subheading 'Prescheduling via a mobility management node'.

Example configurations and operations of nodes which may perform the example embodiments presented herein are given under the subheadings 'Example node configurations' and 'Example node operations', respectively. It should be appreciated that the embodiments described in one subsection may be used in any combination with embodiments described in any other subsection herein.

Prescheduling of MTC Devices

MTC devices are typically devices which infrequently communicate with the wireless network. In order to reduce the amount of used system resources and device power consumption, if a MTC device is not scheduled to communication with the network, it may be in a sleep mode. The MTC device may have a communication schedule reflecting the expected times the device is to communication with the network. Despite the MTC device communicating in a regular or known pattern, in current systems the MTC device sends a service request in order to initiate a communication with the network. Typically, the network does not access subscription or any other form of data indicative of the communication pattern of the MTC device. The network waits for the service request and establishes communication with the MTC. Some of the example embodiments presented herein are directed towards providing a more efficient way of establishing communications with the MTC device such that the above described service request is not needed.

Figure 2:
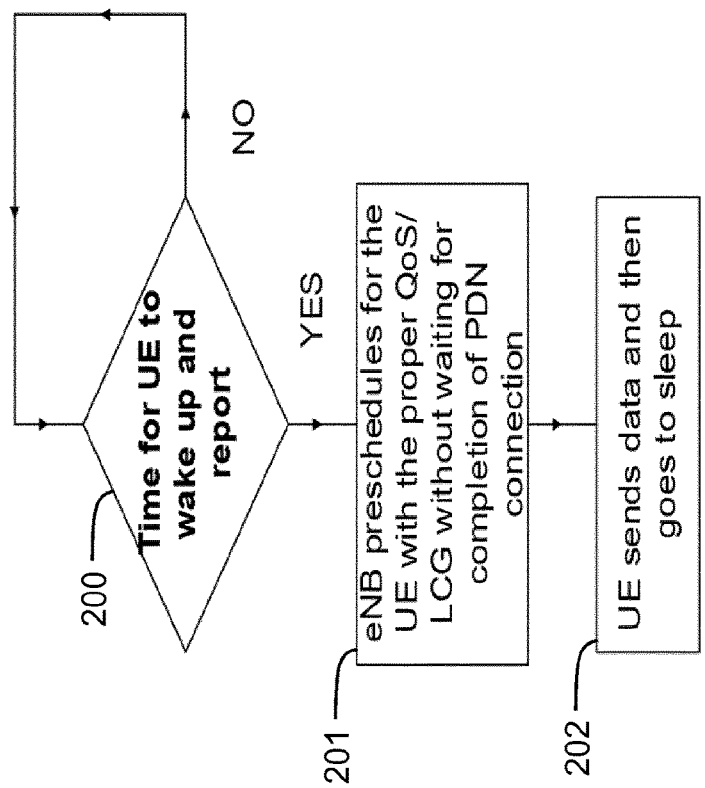
FIG. 2 is a flow diagram depicting example operations for the prescheduling of a MTC device, according to some of the example embodiments.

FIG. 2 illustrates a flow diagram of example operations which may be taken in the prescheduling of a MTC device. As illustrated in FIG. 2, first a certain wireless device may be monitored to determine if it is time for the device to exit a sleep mode and report data to the wireless network (200). Once it is determined that it is time for the device to exit a sleep mode and report to the network, the base station will preschedule communications for the device (201).

According to some of the example embodiments, the base station may be provisioned by an Operation and Maintenance (O&M) system that a given UE has a given amount of data to be sent to a known server on a regular basis, for example, a MTC. In such an instance, the base station will schedule the resources for the UE via the air interface. According to some of the example embodiments, the base station may be configured to reactivate an associated PDN connection, if such a reactivation is needed, prior to the UE reporting time. The reporting time instances may also be configured in the subscription data of the UE so that the UE may be mobile and the base station may obtain the time instances dynamically from the Home Subscription Server (HSS) via the MME. Since the MTC UE is often a fix-mounted machine covered by a known base station, the reporting time instances may also be programmed in the base station or built up by base station via historic data, for example, using analytics or machine learning.

According to some of the example embodiments, the wireless device may also be configured to provide that network with its scheduled reporting time during the attach procedure. Specifically, the wireless device may be preconfigured or hardcoded to send to the network the prescheduling parameters when initiating communication. Upon, the prescheduling and reporting by the wireless device, the device may once again enter into a sleep mode (202).

Figure 3:
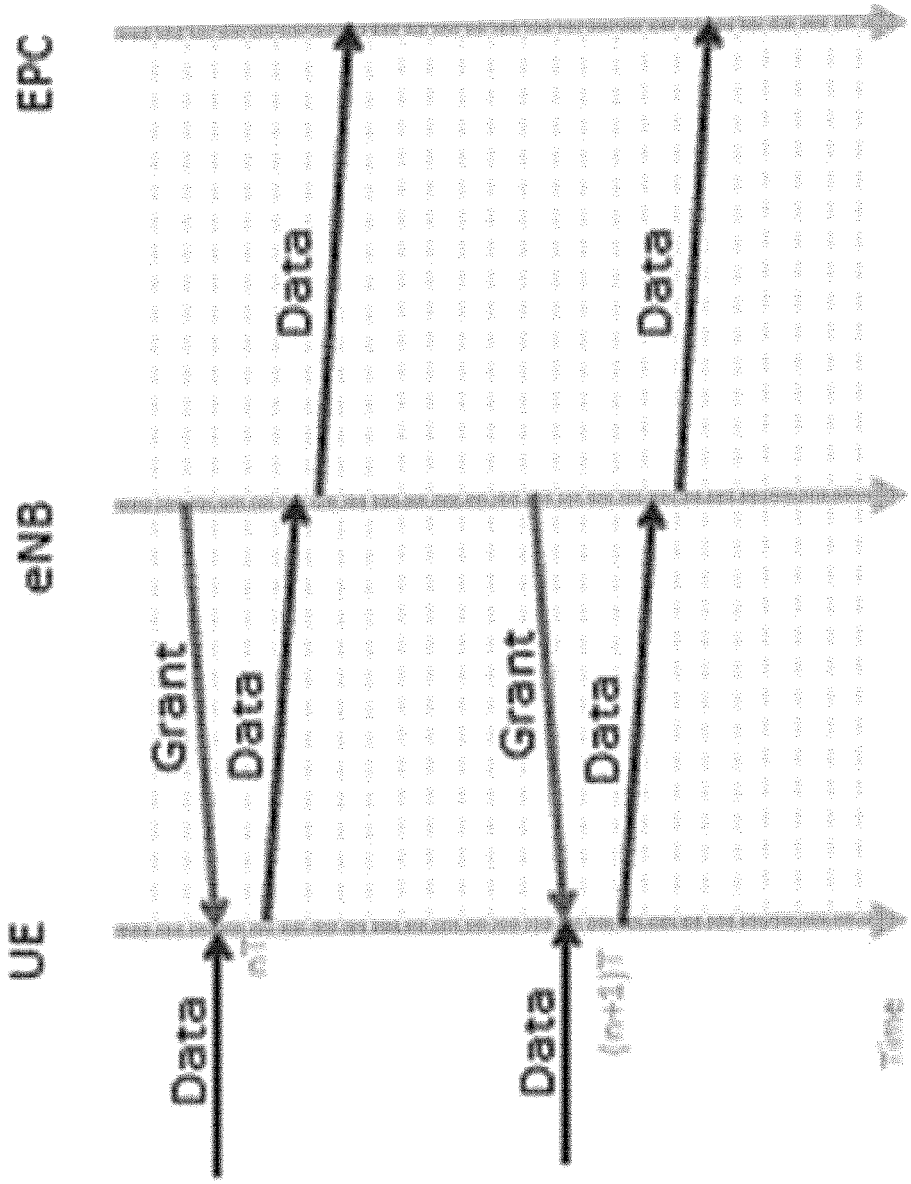
FIG. 3 is a signalling diagram between the wireless device, base station and network as described in FIG. 2, according to some of the example embodiments.

FIG. 3 illustrates a signaling diagram illustrating signaling between the MTC, base station and network in the prescheduling of communications for the MTC. As illustrated in FIG. 3, the grant for UL communications, 'Grant', is presented to the device at the time in which the device is scheduled to send data, 'Data', to the network. The data is provided from the wireless device to the base station and thereafter forwarded to the wireless network.

Figure 4:
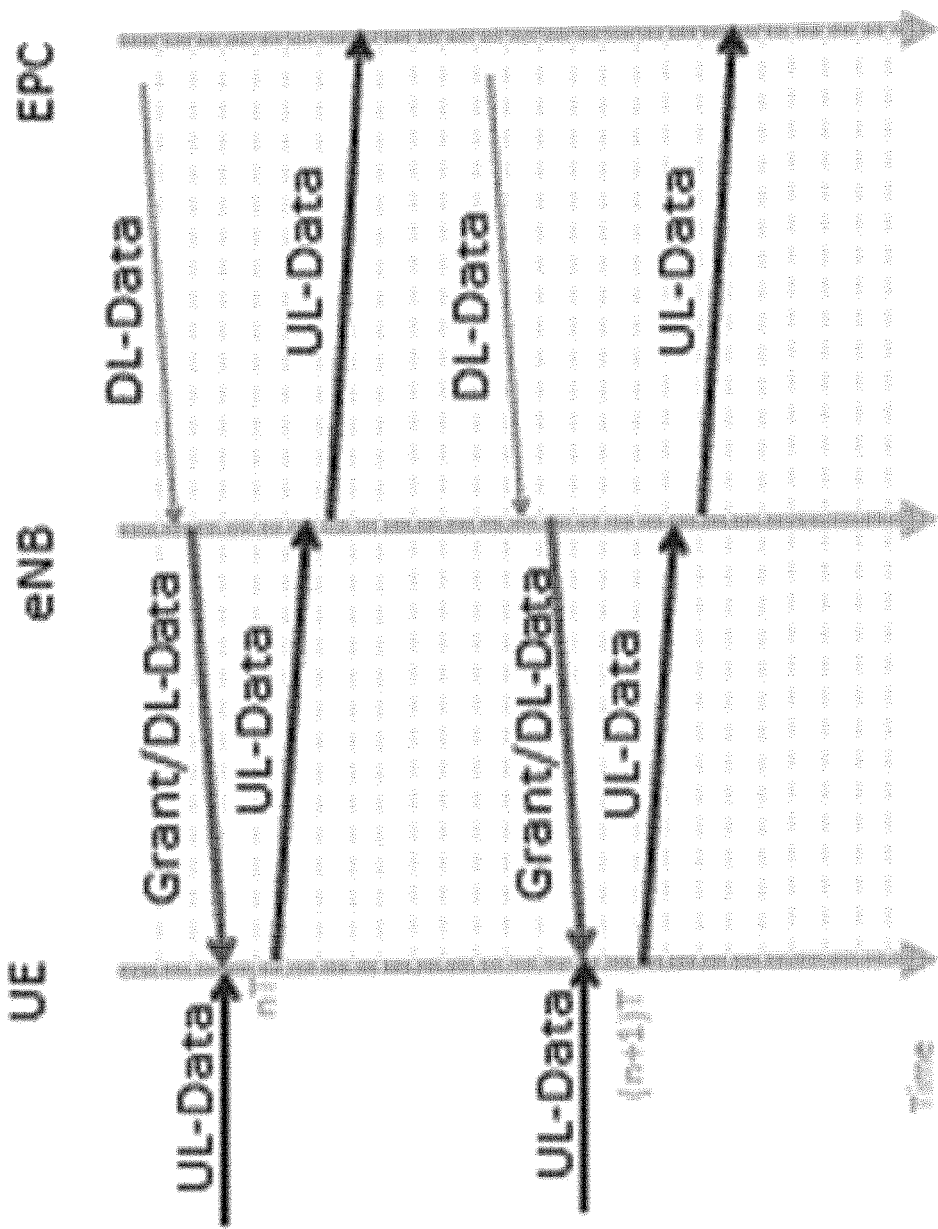
FIG. 4 is a signalling diagram between the wireless device, base station and network as described in FIG. 2 for DL scheduling, according to some of the example embodiments.

FIG. 4 illustrates prescheduling for the MTC device in which downlink data, 'DL-Data', is included with the grant for uplink communications, 'Grant'. The grant for uplink communications, comprising the downlink data, may also be provided at the time the device is scheduled for communications, 'UL-Data', with the network. Thus, FIG. 4 illustrates signaling diagram for fixed control-loop actuators where DL data can be sent to the UE in association with the UL Scheduling Grant without going through the normal paging and service request procedure.

For fixed control-loop actuators, the base station receives control messages periodically via the EPC, and sends it to the machine to be controlled via the inbuilt wireless device in parallel with the UL Transmission Grant. The machine acts accordingly and sends the UL data on measurements, etc., to the base station to be forwarded to the controller via the EPC without the need of Service Request from the wireless device. According to such example embodiments, the base station could be pre-configured with the response time of the application in the wireless device, so that it knows when the UL grant should be given in relation to DL-Data.

Application Based Prescheduling

According to some of the example embodiments, the prescheduling may be performed in response to a specific application which may be used by the wireless device. Specifically, the wireless device may have one or more applications running via various PDN connections. The various PDN connections may have corresponding Quality of Service (QoS) parameters including reporting data to a known server by a given amount of data or at a given time instance. An example of such a scenario may be smart phones with the capability of measuring a user's physical data and communicating with a server at a health center.

The UE may trigger a service-aware prescheduling process to provide the proper radio and EPC bearers prior to normal service activation instance, for example, the user pushes a button or the UE starts a service request when the pre-defined data amount or time instance is reached. As another example, such a service request may be made once a user performs a predefined task within an application, such as opening a contact list.

Figures 5A, 5B:
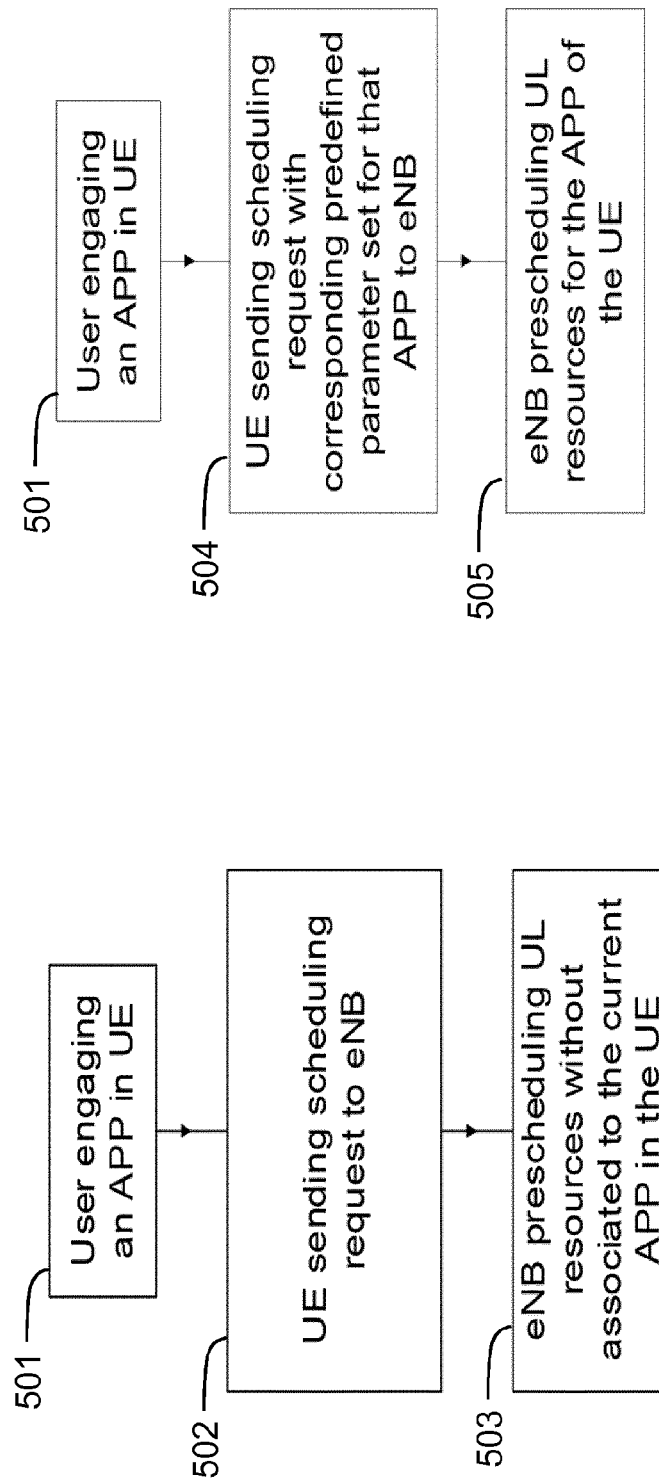
FIG. 5A is a flow diagram depicting example operations for the prescheduling of a wireless device, according to some of the example embodiments.
FIG. 5B is a flow diagram depicting example operations for service-aware prescheduling of a wireless device, according to some of the example embodiments.

FIG. 5A and FIG. 5B illustrate different example embodiments of application based prescheduling. In FIG. 5A, first, a determination is made that a user is using an application or performing a function which will require communication with the network (501). Upon such a determination, the wireless device will send a scheduling request or service request to the base station (502).

The service request may be performed without associating with any specific data types, rather with the purpose of triggering the EPS to reactivate the bearers and base station to send QoS-Logic Channel Group (LCG) parameters to the UE and start scheduling it. When the data comes in the buffer and the active PDN is the proper one for the data to upload, the UE can map the data to the proper LCG and send it via the UL resources scheduled by the base station in terms of the QoS parameters obtained from the EPC for the active PDN. If a new PDN is needed, the UE can start a PDN connection procedure and then map the data to the new LCG to be uploaded via the UL resources scheduled in the eNB for the corresponding QoS parameters.

FIG. 5B illustrates an alternative embodiment to that of FIG. 5A. In FIG. 5B, a similar determination is made with respect to a user using an application or performing a function which will require communication with the network (501). Thereafter, the wireless device sends, to the base station, a scheduling request with a predefined parameter set for a particular application (504). The data to be uploaded can be prescheduled by sending a more advanced service-aware request from the UE in association with a predefined scheduling parameter set for the active application, for example, a nominal size of the data in the UE buffer and QoS parameters stored in a Look-up-Table (LuT) in the UE.

While waiting for the service response from the EPC, the base station will use the predefined parameter set for the application to schedule UL resources with the appropriate date rate and priority for the UE (505). The example embodiment of FIG. 5B may yield even more latency reduction and be valuable for applications such as healthy measurement and reporting, yet imply significant modifications in both UE and base station. The predefined scheduling parameter set, pre-scheduling information, or prescheduling parameter in general, may be information about amount of data to send, timing, data transmission patterns, etc., making it possible for the network to perform more efficient prescheduling of the user. The prescheduling parameter could also include one or more indexes to pre-defined tables containing the detail parameters sets. The pre-defined tables could be defined in a standard, pre-configuration file, etc. It should be appreciated that any number of prescheduling parameters may be sent to the base station.

Figure 6:
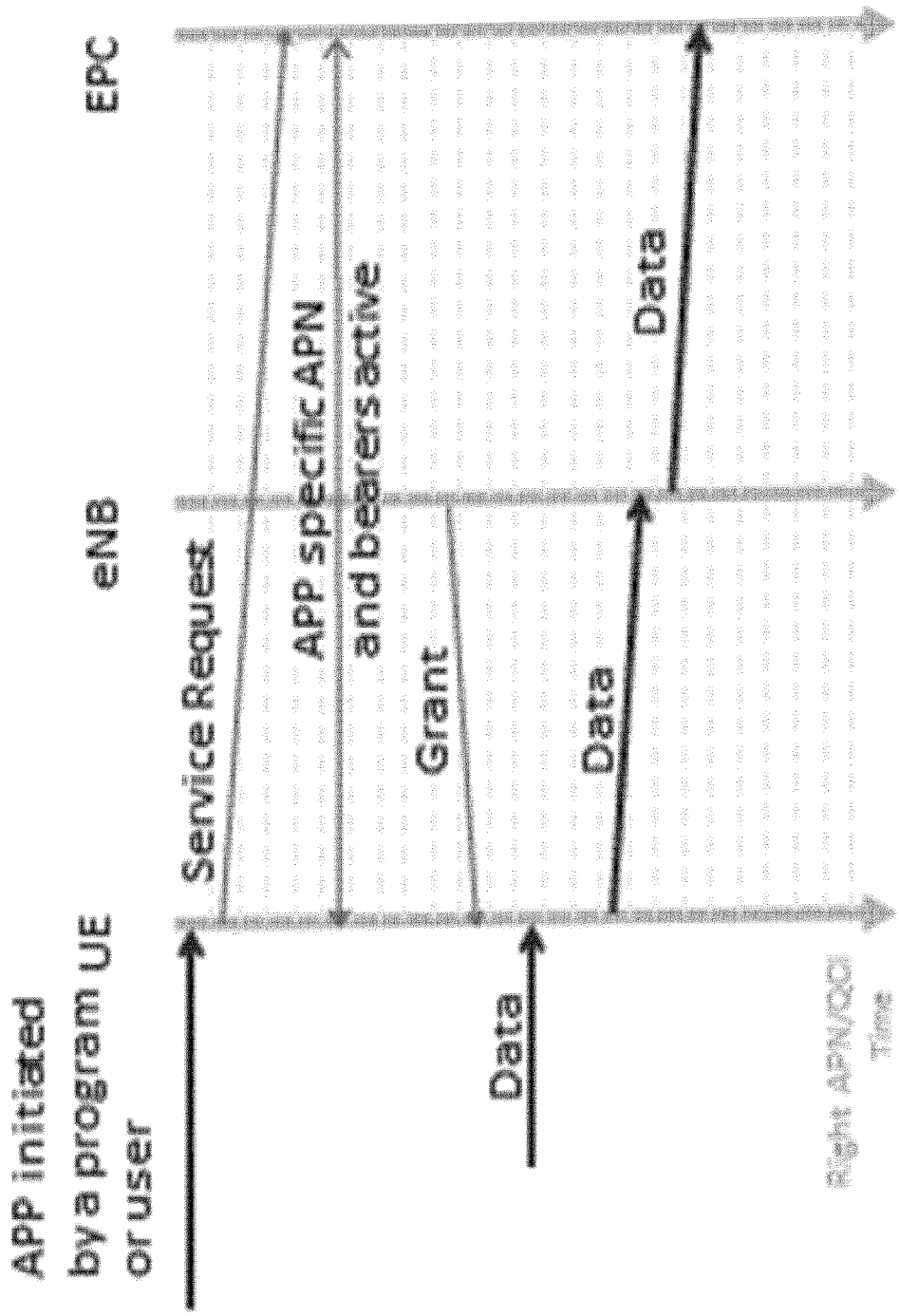
FIG. 6 is a signalling diagram between the wireless device, base station and network as described in FIG. 5B, according to some of the example embodiments.

FIG. 6 illustrates a signaling diagram featuring messages between the wireless device, base station and network. As illustrated, the wireless device sends an indication to the base station that communication is needed based on an application which is currently in use, 'APP initiated by a program or user'. Thereafter, messaging is provided in order to establish the uplink grant for the wireless device, for example, see messages 'Service Request', 'APP specific APN [Access Point Name] and bearers active', and 'Grant'. Such messaging is provided prior to the sending of data by the wireless device, 'Data'.

According to some of the example embodiments, if the user switches to another application before completing the action, which requires communication with the network, to start the on-going one, for example, looking at phonebook for initiating a Voice Over LTE (VoLTE) call replaced by accessing a social NW, the UE is to drop the ongoing prescheduling process and initiate a new one in the same way as described before, as shown in FIG. 7.

Figure 7:
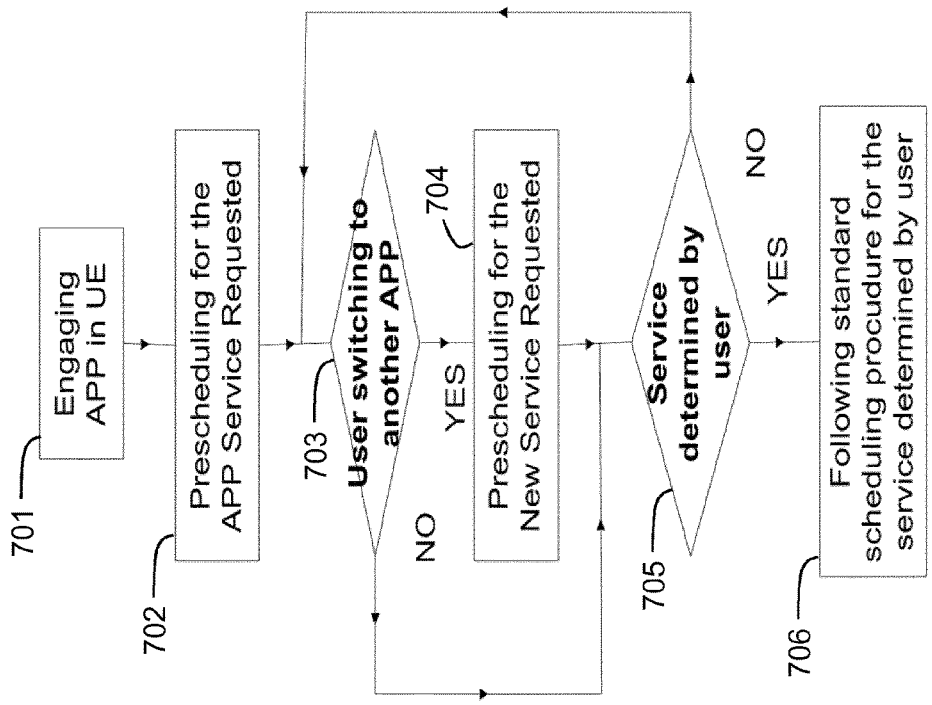
FIG. 7 is a flow diagram depicting example operations for the prescheduling of a wireless device, in which such prescheduling may be dropped or adapted in real time, according to some of the example embodiments.

As illustrated in FIG. 7, first a determination is made as to whether a user has accessed an application or function which requires communication with the network (701). Once an engagement in the application or function has been determined, a determination is made to initiate a prescheduling for the wireless device to send data to the wireless network (702). The prescheduling may be performed as described in conjunction with any of FIGS. 2-6. Thereafter, a detection is made to see whether the user has switched to a new application or function which requires communications with the network (703).

If it is determined that the user has switched to a new application or function, prescheduling associated with the new application/function will be initiated (704). This prescheduling may also be performed as described in conjunction with any of FIGS. 2-6.

It should also be appreciated that current means of scheduling may be used in conjunction with the example embodiments presented herein. For example, the wireless device may determine the need for communications at the time when data needs to be sent (705). If such a need exists, the wireless device may follow standard scheduling procedures as described under the subheading 'General overview' (705). If it is determined that such a need does not exists, the wireless device may continue to monitor if the user has accessed an application or function which requires a communication with the network (703) and thereafter send a service request before such a communication is to be made with the network (704).

Prescheduling and Priority

According to some of the example embodiments, a decision on whether or not to provide prescheduling may be made by taking into account a priority of an application or device and/or a current network congestion. According to some of the example embodiments, the base station uses the knowledge of prescheduling in handling the priority or resource allocation for the wireless device. For example, in high load situations, the base station may downgrade the prescheduling request priority or reduce the granted resources. The knowledge of the predefined prescheduling parameter for common applications may be provisioned in the base station or built up with historical data. According to some of the example embodiments, a flag of prescheduling or low priority can be sent from a wireless device to EPS nodes to perform prescheduling only when there are unused resources available.

Prescheduling Via a Mobility Management Node

According to some of the example embodiments, a mobility management node, for example, a MME, SGSN, or S4-SGSN, may be configured to perform the prescheduling in the same manner as the base station as described in the preceding subsections. For example, triggered by an active application in a wireless device, the mobility management node is to initiate the bearer set-up procedure for the engaged application. A default bearer with corresponding to QoS parameters is activated, while dedicated bearers can be set up if needed, for example, for VoLTE, there is a default bearer with QoS Class Id 5 for Internet Protocol Multimedia Subsystem (IMS) signaling and a dedicated bearer with QoS Class Id 1 for voice traffic. The QoS parameters are then sent to base station and the wireless device, to be used as parameters for scheduling of resources of the application. Instead of being used in the standard radio resource scheduling process, the bearer set-up process is used here for prescheduling so as to reduce the latency of initial connections.

Example Node Configurations

Figure 8:
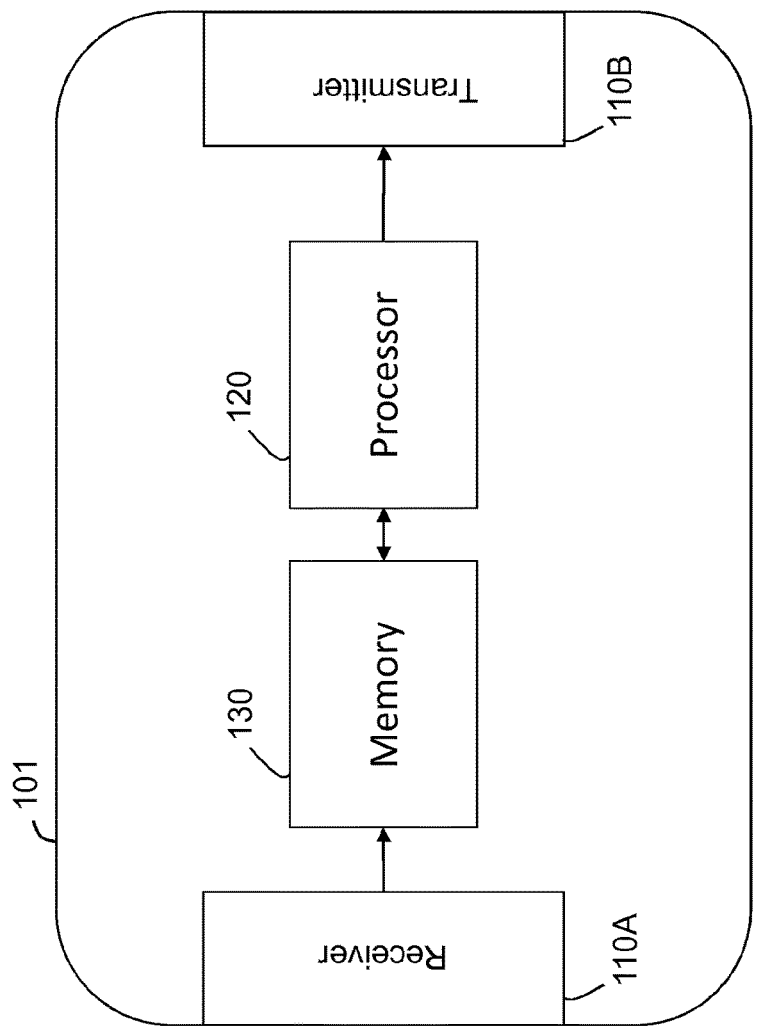
FIG. 8 is an example node configuration of a wireless device, according to some of the example embodiments.

FIG. 8 illustrates an example node configuration of a wireless device. The wireless device may perform prescheduling according to the example embodiments described herein. The wireless device may comprise a receiver 110A that may be configured to receive communication data, instructions, and/or messages. The wireless device may also comprise a transmitter 110B that may be configured to transmit communication data, instructions and/or messages. It should be appreciated that the receiver 110A and transmitter 110B may be comprised as any number of transceiving, receiving, and/or transmitting units, modules or circuitry. It should further be appreciated that the receiver 110A and transmitter 110B may be in the form of any input or output communications port known in the art. The receiver 110A and transmitter 110B may comprise RF circuitry and baseband processing circuitry (not shown).

The wireless device may also comprise a processor or circuitry 120 which may be configured to provide prescheduling as described herein. The processor 120 may be any suitable type of computation unit, for example, a microprocessor, digital signal processor (DSP), field programmable gate array (FPGA), or application specific integrated circuit (ASIC), or any other form of circuitry or module. The wireless device may further comprise a memory or circuitry 130 which may be any suitable type of computer readable memory and may be of volatile and/or non-volatile type. The memory 130 may be configured to store received, transmitted, priority, scheduling and/or measured data, device parameters, and/or executable program instructions.

Figure 9:
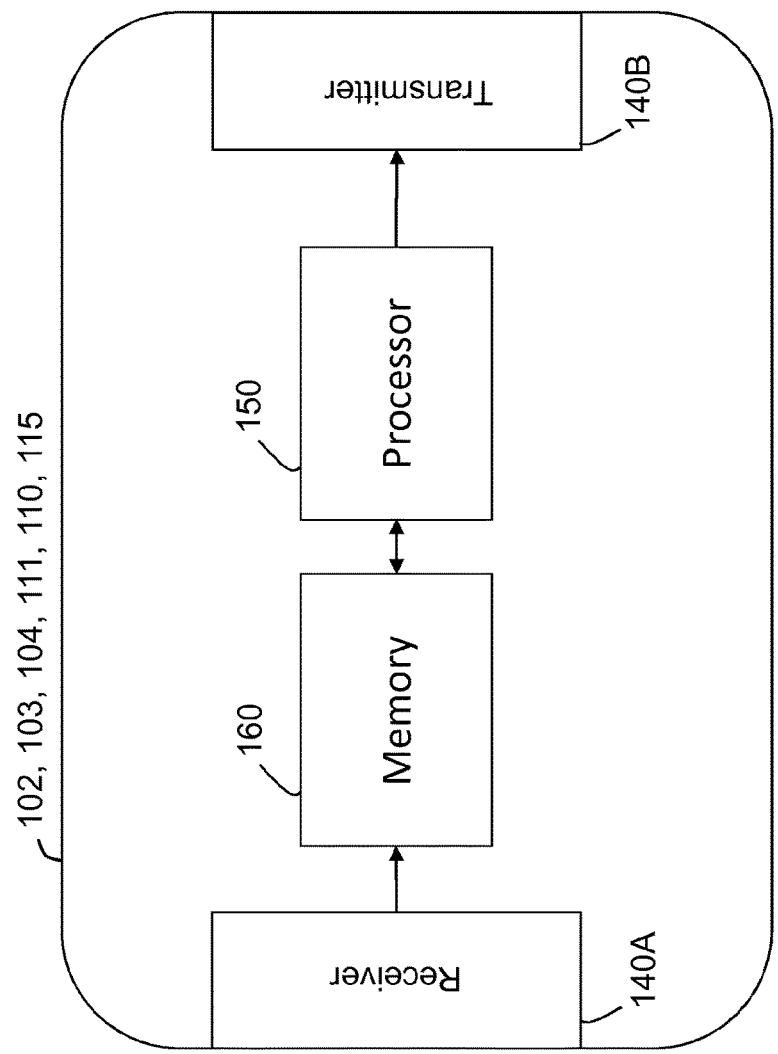
FIG. 9 is an example node configuration of a network node, according to some of the example embodiments.

FIG. 9 illustrates an example node configuration of a network node. A network node herein may be a base station or a mobility management node. A mobility management node may be a MME, SGSN or a S4-SGSN. The network node may perform prescheduling according to the example embodiments described herein. The network node may comprise a receiver 140A that may be configured to receive communication data, instructions, and/or messages. The network node may also comprise a transmitter 140B that may be configured to transmit communication data, instructions and/or messages. It should be appreciated that the receiver 140A and transmitter 140B may be comprised as any number of transceiving, receiving, and/or transmitting units, modules or circuitry. It should further be appreciated that the receiver 140A and transmitter 140B may be in the form of any input or output communications port known in the art. The receiver 140A and transmitter 140B may comprise RF circuitry and baseband processing circuitry (not shown).

The network node may also comprise a processor or circuitry 150 which may be configured to provide prescheduling as described herein. The processor 150 may be any suitable type of computation unit, for example, a microprocessor, digital signal processor (DSP), field programmable gate array (FPGA), or application specific integrated circuit (ASIC), or any other form of circuitry or module. The network node may further comprise a memory or circuitry 160 which may be any suitable type of computer readable memory and may be of volatile and/or non-volatile type. The memory 160 may be configured to store received, transmitted, priority, scheduling and/or measured data, device parameters, and/or executable program instructions.

Example Node Operations

Figure 10A:
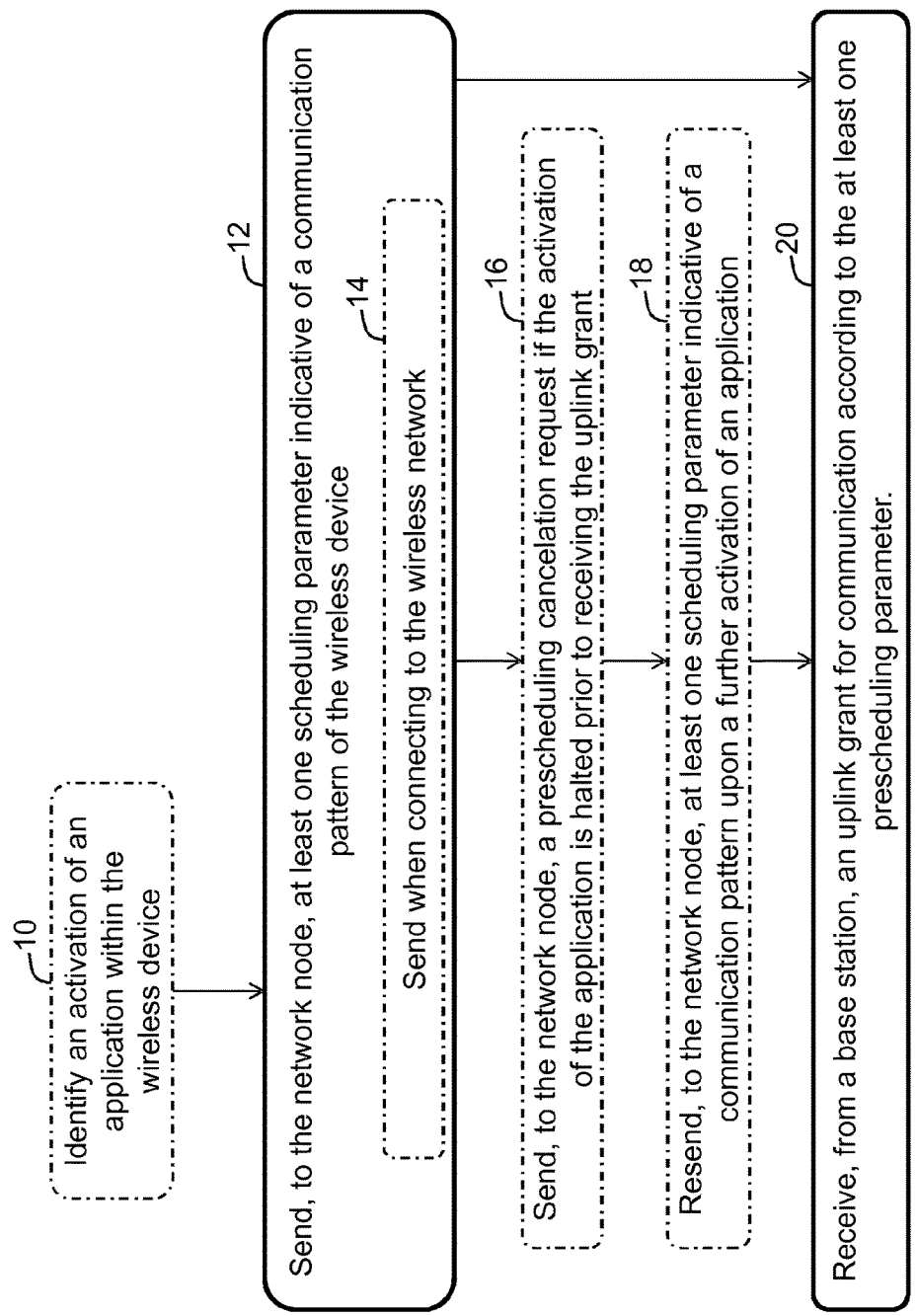
FIG. 10A is a flow diagram depicting example operations performed by the wireless device of FIG. 8 according to some of the example embodiments.

FIG. 10A is a flow diagram depicting example operations which may be taken by the wireless device for prescheduling as described herein. It should also be appreciated that FIG. 10A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

Figure 10B:
FIG. 10B is a module diagram of the wireless device of FIG. 8, according to some of the example embodiments.

FIG. 10B is a module diagram depicting modules which may perform at least some of the operations of FIG. 10A.

It should be appreciated that the operations described below refer to a network node. The network node herein may be a base station or a mobility management node. A mobility management node may be a MME, SGSN or a S4-SGSN.

Example Operation 10

According to some of the example embodiments, the wireless device is operative to identify 10 an activation of an application within the wireless device, where an uplink communication to be prescheduled is associated with the application. This example embodiment is further described under at least the subheading 'Application based prescheduling'. Such an identification may be used as a trigger for the sending operation 12 described below.

Operation 12

The wireless device is operative to send 12, to a network node, at least one prescheduling parameter indicative of a communication pattern of the wireless device. The sending module 12A is configured to perform operation 12. The communication pattern describes how the wireless device will communicate with the wireless network.

According to some of the example embodiments, the communication pattern may comprise information regarding how frequent communication is made or a communication schedule for the wireless device.

According to some of the example embodiments, the at least one prescheduling parameter may comprise an indication that uplink communication needs to be prescheduled. According to some of the example embodiments, the at least one prescheduling parameter comprises an identification of an application or service associated with the uplink communication. Such example embodiments are further described under at least the subheading 'Application based prescheduling'.

According to some of the example embodiments, the communication pattern may also comprise information regarding a QoS level, a LCG or a priority level. These example embodiments are further described under at least the subheadings 'Application based prescheduling' and 'Prescheduling and priority'.

According to some of the example embodiments, the wireless device may be a M2M or MTC device and the at least one prescheduling parameter is an uplink communication schedule of the M2M or MTC device. Such an embodiment is further described under at least the subheading 'Prescheduling of MTC devices'.

According to some of the example embodiments, the at least one prescheduling parameter comprises an index to a predefined table comprising further parameters associated with the uplink communication to be prescheduled. This example embodiment is further described under at least the subheading 'Application based prescheduling'. It should also be appreciated that such example embodiments may also be applied to the prescheduling of MTC devices.

Example Operation 14

According to some of the example embodiments, the sending 12 may comprise sending 14 the at least one prescheduling parameter when connecting to the wireless network. For example, a MTC device comprises a known communication schedule. Thus, such a schedule may be sent to the network in the form of a prescheduling parameter during an attach procedure. Such an example embodiment is further described under at least the subheading 'Prescheduling of MTC devices'.

Example Operation 16

According to some of the example embodiments, the wireless device is further operative to send 16, to the network node, a prescheduling cancellation request if the activation of the application is halted prior to receiving the uplink grant.

For example, if the wireless detects the use of an application, service or function that will require uplink communication, the wireless device may request the prescheduling of the uplink communication. However, if the use of the application, service or function is halted prior to receiving the grant for uplink communication, the cancellation request may be sent in order to reduce unnecessary use of network resources. Such an example embodiment is further described under at least the subheading 'Application based prescheduling'.

Example Operation 18

According to some of the example embodiments, the wireless device is further operative to resend 18, to the network node, the at least one prescheduling parameter indicative of a communication pattern of the wireless device upon a further identification of an activation of an application, service or function requiring uplink communications. Such an example embodiment is further described under at least the subheading 'Application based prescheduling'.

Operation 20

The wireless device is also operative to receive 20, from a base station, an uplink grant for communication according to the at least one prescheduling parameter. The receiving module 20A is configured to perform operation 20.

Figure 11A:
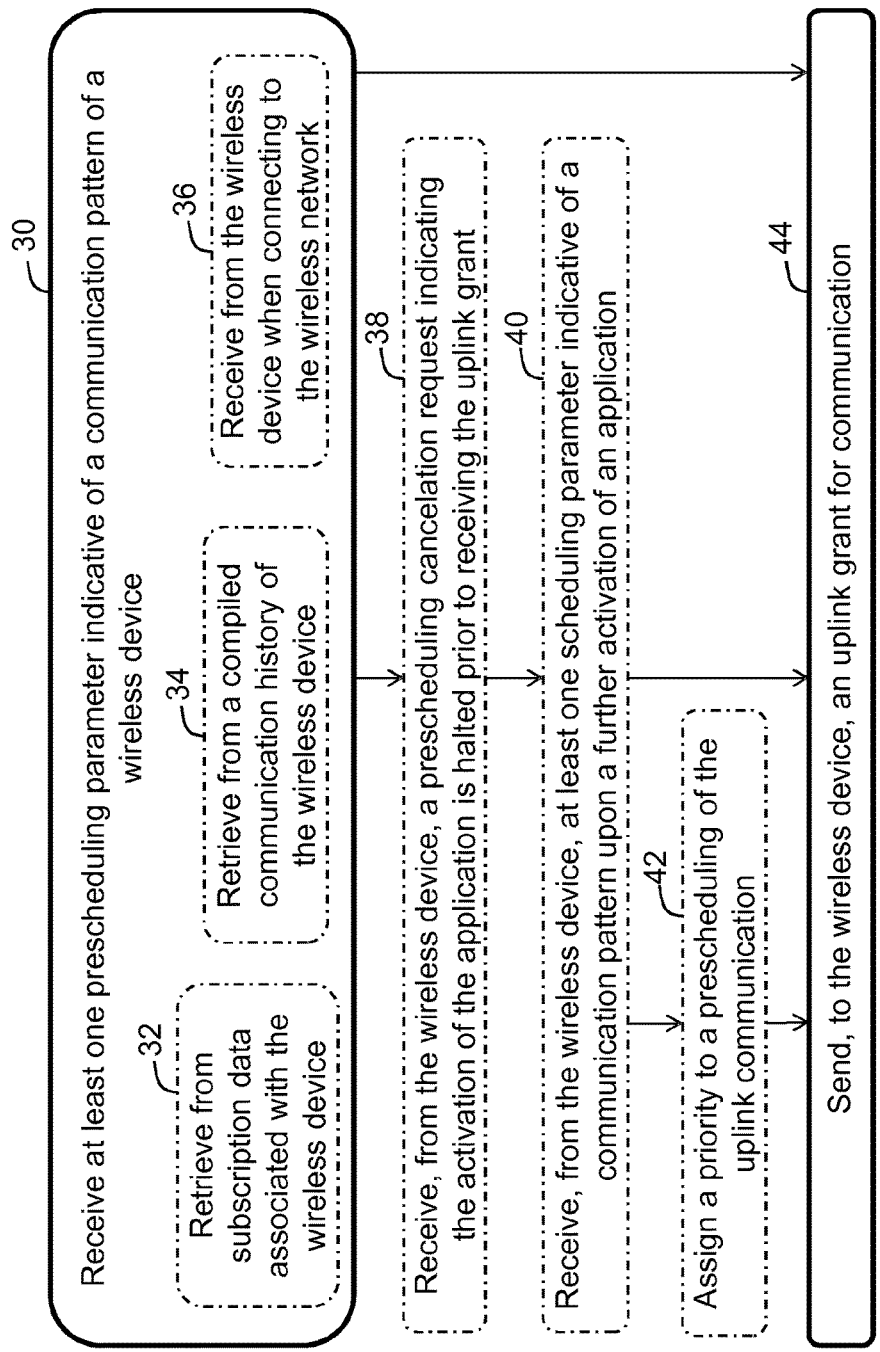
FIG. 11A is a flow diagram depicting example operations performed by the network node of FIG. 9, according to some of the example embodiments.

FIG. 11A is a flow diagram depicting example operations which may be taken by the network node for prescheduling as described herein. The network node herein may be a base station or a mobility management node. It should also be appreciated that FIG. 11A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

Figure 11B:
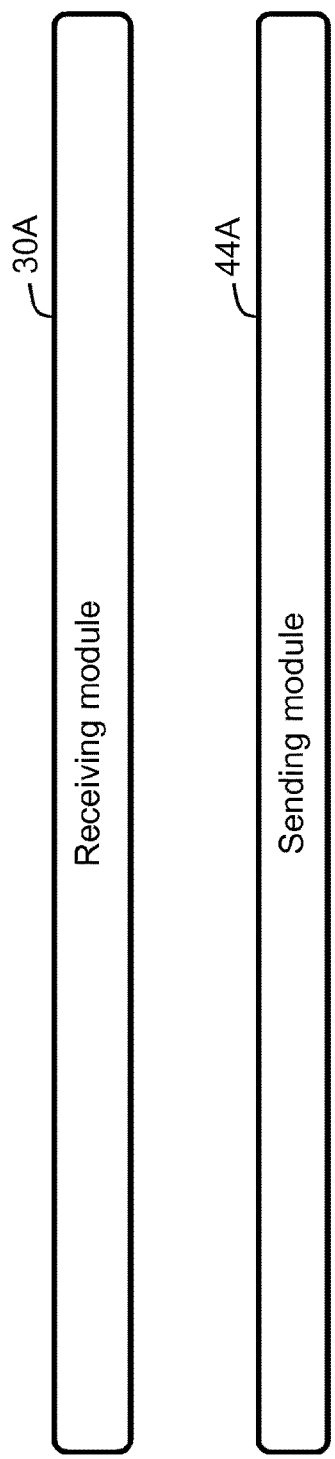
FIG. 11B is a module diagram of the network node of FIG. 9, according to some of the example embodiments.

FIG. 11B is a module diagram depicting modules which may perform at least some of the operations of FIG. 11A.

Operation 30

The network node is operative to receive 30 at least one prescheduling parameter indicative of a communication pattern of a wireless device. The receiving module 30A is configured to perform operation 30. The communication pattern describes how the wireless device will communicate with the wireless network.

According to some of the example embodiments, the communication pattern may comprise information regarding how frequent communication is made or a communication schedule for the wireless device.

According to some of the example embodiments, the at least one prescheduling parameter may comprise an indication that uplink communication needs to be prescheduled. According to some of the example embodiments, the at least one prescheduling parameter comprises an identification of an application or service associated with the uplink communication. Such example embodiments are further described under at least the subheading 'Application based prescheduling'.

According to some of the example embodiments, the communication pattern may also comprise information regarding a QoS level, a LCG or a priority level. These example embodiments are further described under at least the subheadings 'Application based prescheduling' and 'Prescheduling and priority'.

According to some of the example embodiments, the wireless device may be a M2M or MTC device and the at least one prescheduling parameter is an uplink communication schedule of the M2M or MTC device. Such an embodiment is further described under at least the subheading 'Prescheduling of MTC devices'.

According to some of the example embodiments, the at least one prescheduling parameter comprises an index to a predefined table comprising further parameters associated with the uplink communication to be prescheduled. This example embodiment is further described under at least the subheading 'Application based prescheduling'. It should also be appreciated that such example embodiments may also be applied to the prescheduling of MTC devices.

Example Operation 32

According to some of the example embodiments, the receiving 30 further comprises retrieving 32 the at least one prescheduling parameter from subscription data associated with the wireless device.

For example, some devices, such as MTC devices, comprise a known communication schedule. This schedule may be retrieved from network nodes such as a HSS or HLR. It should be appreciated that example operation 32 is an alternative embodiment with respect to the embodiment described in example operation 14, wherein the wireless device sends the network node its known communication schedule. Such example embodiments are further described under at least the subheading 'Prescheduling of MTC devices'.

Example Operation 34

According to some of the example embodiments, the receiving 30 further comprises retrieving 34 the at least one prescheduling parameter from a complied communication history of the wireless device. Thus, if the wireless device has a recognized pattern of communicating with the network, for example, at a certain time or location, the network may regard such a history as a prescheduling parameter. It should be appreciated while MTC devices comprise repetitive communication patterns, example operation 34 need not be limited to MTC devices but may also be applied to wireless devices in general.

Example Operation 36

According to some of the example embodiments, the receiving 30 further comprises receiving 36 the at least one prescheduling parameter from the wireless device when the wireless device is connecting to the network.

For example, a MTC device comprises a known communication schedule. Thus, such a schedule may be sent to the network in the form of a prescheduling parameter during an attach procedure. Such an example embodiment is further described under at least the subheading 'Prescheduling of MTC devices'.

Example Operation 38

According to some of the example embodiments, the network node is further operative to receive 38, from the wireless device, a prescheduling cancellation request if the activation of the application is halted prior to receiving the uplink grant.

For example, if the wireless detects the use of an application, service or function that will require uplink communication, the wireless device may request the prescheduling of the uplink communication. However, if the use of the application, service or function is halted prior to receiving the grant for uplink communication, the cancellation request may be sent in order to reduce unnecessary use of network resources. Such an example embodiment is further described under at least the subheading 'Application based prescheduling'.

Example Operation 40

According to some of the example embodiments, the network node is further operative to receive 40, from the wireless device, the at least one prescheduling parameter indicative of a communication pattern of the wireless device upon a further identification of an activation of an application, service or function requiring uplink communications. Such an example embodiment is further described under at least the subheading 'Application based prescheduling'.

Example Operation 42

According to some of the example embodiments, the network node is further operative to assign 42 a priority to a prescheduling of the uplink communication for the wireless device. The priority is based on at least a current network congestion level. Thus, if the network is congested, the network node may decide not to preschedule the uplink communication or delay the prescheduling of the uplink communication at a later time. Such an example embodiment is described further under at least the subheading 'Prescheduling and priority'.

Operation 44

The network node is further operative to send 44, to the wireless device, an uplink grant for communication according to the at least one prescheduling parameter. The sending module 44A is configured to perform operation 44.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access. Furthermore, it should be appreciated that the term M2M device shall be interpreted as a sub-class of user equipments which engage in infrequent communications.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following listing of claims

The invention claimed is:

1. A method, in a wireless device, for prescheduling an uplink communication in a wireless network, the method comprising:
  identifying an activation of an application within the wireless device, wherein the uplink communication to be prescheduled is associated with the application;
  determining that the application or service activated on the wireless device will need to communicate with the wireless network;
  sending, to a network node responsive to the determining, at least one prescheduling parameter indicative of a communication pattern of the application or service activated on the wireless device, the communication pattern comprising information about a communication schedule of the application or service indicating an expected timing at which the wireless device is to communicate with the network;
  receiving, from a base station, an uplink grant for communication based on the expected timing, wherein the uplink grant comprises an allocation of uplink resources on a shared uplink channel to the wireless device for an uplink transmission; and
  transmitting data associated with the application or service on the uplink shared channel using the allocated uplink resources;
  sending, to the network node, a preschedulinq cancellation request responsive to the activation of the application being halted prior to receiving the uplink grant; and
  resendinq, to the network node, the at least one preschedulinq parameter indicative of a communication pattern of the wireless device upon a further identification of an activation of an application.

2. The method of claim 1, wherein the sending comprises sending the at least one prescheduling parameter when connecting to the wireless network.

3. The method of claim 2:
  wherein the wireless device is a machine-to-machine device; and
  wherein the at least one prescheduling parameter is an uplink communication schedule of the machine-to-machine device.

4. The method of claim 1, wherein the at least one prescheduling parameter comprises an indication that an uplink communication needs to be prescheduled.

5. The method of claim 1, wherein the at least one prescheduling parameter comprises an identification of the application or a service associated with the uplink communication to be prescheduled.

6. The method of claim 1, wherein the at least one prescheduling parameter comprises a Quality of Service level, Logic Channel Group parameters, and/or a priority level of the uplink communication to be prescheduled.

7. The method of claim 1, wherein the at least one prescheduling parameter comprises an index to a predefined table comprising further parameters associated with the uplink communication to be prescheduled.

8. A wireless device for prescheduling an uplink communication in a wireless network, the wireless device comprising:
processing circuitry; and
memory containing instructions executable by the processing circuitry whereby the wireless device is operative to:
identify an activation of an application within the wireless device, wherein the uplink communication to be prescheduled is associated with the application;
determine that the application or service activated on the wireless device will need to communicate with the wireless network;
send, to a network node responsive to the determining, at least one prescheduling parameter indicative of a communication pattern of the application or service activated on the wireless device, the communication pattern comprising information about a communication schedule of the application or service indicating an expected timing at which the wireless device is to communicate with the network;
receive, from a base station, an uplink grant for communication according to the communication schedule, wherein the uplink grant comprises an allocation of uplink resources on a shared uplink channel to the wireless device for an uplink transmission;
transmit data associated with the application or service on the uplink shared channel using the allocated uplink resources;
send, to the network node, a preschedulinq cancellation request if the activation of the application is halted prior to receiving the uplink grant; and
resend, to the network node, the at least one preschedulinq parameter indicative of a communication pattern of the wireless device upon a further identification of an activation of an application.

9. The wireless device of claim 8, wherein the instructions are such that the wireless device is operative to send the at least one prescheduling parameter when connecting to the wireless network.

10. The wireless device of claim 9:
wherein the wireless device is a machine-to-machine device; and
wherein the at least one prescheduling parameter is an uplink communication schedule of the machine-to-machine device.

11. The wireless device of claim 8, wherein the at least one prescheduling parameter comprises an indication that an uplink communication needs to be prescheduled.

12. The wireless device of claim 8, wherein the at least one prescheduling parameter comprises an identification of the application or a service associated with the uplink communication to be prescheduled.

13. The wireless device of claim 8, wherein the at least one prescheduling parameter comprises a Quality of Service level, Logic Channel Group parameters, and/or a priority level of the uplink communication to be prescheduled.

14. The wireless device of claim 8, wherein the at least one prescheduling parameter comprises an index to a predefined table comprising further parameters associated with the uplink communication to be prescheduled.

15. The wireless device of claim 8, wherein the network node is a base station, a Mobility Management Entity, a Serving General Packet Radio Service Support Node, (SGSN), or a S4-SGSN serving the wireless device.

16. A method, in a network node, for prescheduling an uplink communication in a wireless network, the method comprising:
receiving at least one prescheduling parameter indicative of a communication pattern of an application or service activated on a wireless device, the communication pattern comprising information about a communication schedule of the application or service indicating an expected timing at which the wireless device is to communicate with the network;
assigning a priority to a prescheduling of the uplink communication for the wireless device, wherein the priority is based on at least a current network congestion level;
sending, to the wireless device, an uplink grant for communication based on the expected timing, wherein the uplink grant comprises an allocation of uplink resources on a shared uplink channel to the wireless device for an uplink transmission; and
receiving data associated with the application or service on the uplink shared channel using the allocated uplink resources.

17. The method of claim 16, wherein receiving at least one prescheduling parameter comprises retrieving the at least one prescheduling parameter from subscription data associated with the wireless device.

18. The method of claim 16, wherein receiving at least one prescheduling parameter comprises retrieving the at least one prescheduling parameter from a compiled communication history of the wireless device.

19. The method of claim 16, wherein receiving at least one prescheduling parameter comprises receiving the at least one prescheduling parameter from the wireless device when the wireless device is connecting to the wireless network.

20. The method of claim 16, wherein the at least one prescheduling parameter comprises an indication that an uplink communication needs to be prescheduled.

21. The method of claim 20, wherein the at least one prescheduling parameter comprises an identification of the application or a service associated with the application.

22. The method of claim 20, wherein the at least one prescheduling parameter comprises a Quality of Service level, Logic Channel Group parameters, and/or a priority level of the uplink communication to be prescheduled.

23. The method of claim 20, wherein the at least one prescheduling parameter comprises an index to a predefined table comprising further parameters associated with the uplink communication to be prescheduled.

24. The method of claim 21, comprising:
receiving, from the wireless device, a prescheduling cancellation request indicating the activation of the application is halted prior to receiving the uplink grant; and
receiving, from the wireless device, the at least one prescheduling parameter indicative of a communication pattern upon a further activation of an application.

25. A network node for prescheduling an uplink communication in a wireless network, the network node comprising:
processing circuitry;
memory containing instructions executable by the processing circuitry whereby the network node is operative to:
receive at least one prescheduling parameter indicative of a communication pattern of the application or service activated on a wireless device, the communication pattern comprising information about a communication schedule of an application or service indicating an expected timing at which the wireless device is to communicate with the network;

assign a priority to a prescheduling of the uplink communication for the wireless device, wherein the priority is based on at least a current network congestion level;

send, to the wireless device, an uplink grant for communication based on the expected timing, wherein the uplink grant comprises an allocation of uplink resources to the wireless device for an uplink transmission; and receive data associated with the application or service on an uplink shared channel using the allocated uplink resources.

26. The network node of claim 25, wherein the instructions are such that the network node is operative to retrieve the at least one prescheduling parameter from subscription data associated with the wireless device.

27. The network node of claim 25, wherein the instructions are such that the network node is operative to retrieve the at least one prescheduling parameter from a compiled communication history of the wireless device.

28. The network node of claim 25, wherein the instructions are such that the network node is operative to receive the at least one prescheduling parameter from the wireless device when the wireless device is connecting to the wireless network.

29. The network node of claim 25, wherein the at least one prescheduling parameter comprises an indication that an uplink communication needs to be prescheduled.

30. The network node of claim 29, wherein the at least one prescheduling parameter comprises an identification of the application or a service associated with the application.

31. The network node of claim 29, wherein the at least one prescheduling parameter comprises a Quality of Service level, Logic Channel Group parameters, and/or a priority level of the uplink communication to be prescheduled.

32. The network node of claim 29, wherein the at least one prescheduling parameter comprises an index to a predefined table comprising further parameters associated with the uplink communication to be prescheduled.

33. The network node of claim 30, wherein the instructions are such that the network node is operative to:

receive, from the wireless device, a prescheduling cancellation request indicating the activation of the application is halted prior to receiving the uplink grant; and receive, from the wireless device, the at least one prescheduling parameter indicative of a communication pattern upon a further activation of an application.

34. The network node of claim 25, wherein the network node is a base station, Mobility Management Entity, a Serving General Packet Radio Service Support Node (SGSN), or a S4-SGSN serving the wireless device.

* * * * *

UNITED STATES PATENT AND TRADEMARK OFFICE
CERTIFICATE OF CORRECTION

| | | |
|---|---|---|
| PATENT NO. | : 11,950,236 B2 | Page 1 of 2 |
| APPLICATION NO. | : 15/565219 | |
| DATED | : April 2, 2024 | |
| INVENTOR(S) | : Wang et al. | |

It is certified that error appears in the above-identified patent and that said Letters Patent is hereby corrected as shown below:

In the Drawings

In Fig. 2, Sheet 2 of 13, for Tag "200", Line 3, delete "report" and insert -- report? --, therefor.

In Fig. 7, Sheet 7 of 13, for Tag "703", Line 2, delete "APP" and insert -- APP? --, therefor.

In Fig. 7, Sheet 7 of 13, for Tag "705", Line 3, delete "user" and insert -- user? --, therefor.

In Fig. 7, Sheet 7 of 13, for Tag "706", Line 2, delete "procudure" and insert -- procedure --, therefor.

In Fig. 10A, Sheet 10 of 13, and on the title page, the illustrative print figure, for Tag "16", Line 1, delete "cancelation" and insert -- cancellation --, therefor.

In Fig. 10A, Sheet 10 of 13, and on the title page, the illustrative print figure, for Tag "20", Line 2, delete "parameter." and insert -- parameter --, therefor.

In Fig. 11A, Sheet 12 of 13, for Tag "38", Line 1, delete "cancelation" and insert -- cancellation --, therefor.

In the Specification

In Column 4, Line 55, delete "Sever" and insert -- Server --, therefor.

In Column 7, Line 5, delete "Subscription" and insert -- Subscriber --, therefor.

In Column 8, Line 14, delete "QoS-Logic" and insert -- QoS-Logical --, therefor.

In the Claims

In Column 16, Line 36, in Claim 1, delete "preschedulinq" and insert -- prescheduling --, therefor.

Signed and Sealed this
Eighteenth Day of June, 2024

Katherine Kelly Vidal
*Director of the United States Patent and Trademark Office*

In Column 16, Line 40, in Claim 1, delete "resendinq" and insert -- resending --, therefor.

In Column 16, Lines 40-41, in Claim 1, delete "preschedulinq" and insert -- prescheduling --, therefor.

In Column 17, Line 32, in Claim 8, delete "preschedulinq" and insert -- prescheduling --, therefor.

In Column 17, Lines 35-36, in Claim 8, delete "preschedulinq" and insert -- prescheduling --, therefor.